(12) United States Patent
Nakamura

(10) Patent No.: US 7,043,576 B2
(45) Date of Patent: May 9, 2006

(54) PERIPHERAL UNIT MANAGEMENT SYSTEM, METHOD AND PROGRAM RECORDING MEDIUM THEREFOR

(75) Inventor: Yoshinobu Nakamura, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 466 days.

(21) Appl. No.: 09/768,360

(22) Filed: Jan. 25, 2001

(65) Prior Publication Data
US 2002/0046312 A1 Apr. 18, 2002

(30) Foreign Application Priority Data
Jul. 31, 2000 (JP) ............................. 2000-232152

(51) Int. Cl.
*G06F 13/00* (2006.01)
*G06F 3/00* (2006.01)

(52) U.S. Cl. ..................... 710/104; 710/9; 358/1.15

(58) Field of Classification Search ................ 710/104, 710/302, 8, 9; 324/719; 358/1.15; 400/61
See application file for complete search history.

(56) References Cited

U.S. PATENT DOCUMENTS

| | | | | |
|---|---|---|---|---|
| 5,580,177 | A * | 12/1996 | Gase et al. .................... | 400/61 |
| 6,044,411 | A * | 3/2000 | Berglund et al. .............. | 710/9 |
| 6,243,774 | B1 * | 6/2001 | Eide et al. .................... | 710/302 |
| 6,265,885 | B1 * | 7/2001 | Luo et al. ..................... | 324/719 |
| 6,289,405 | B1 * | 9/2001 | Movall et al. ................ | 710/104 |
| 6,427,176 | B1 * | 7/2002 | Berglund et al. .............. | 710/8 |
| 6,804,019 | B1 * | 10/2004 | Shiohara ..................... | 358/1.15 |

FOREIGN PATENT DOCUMENTS

| | | |
|---|---|---|
| JP | 10-247962 | 9/1998 |
| JP | 11-194915 | * 7/1999 |
| JP | 11-327936 | 11/1999 |
| JP | 2000-132365 | 5/2000 |

* cited by examiner

*Primary Examiner*—Glenn A. Auve
*Assistant Examiner*—Christopher E. Lee
(74) *Attorney, Agent, or Firm*—Staas & Halsey LLP

(57) ABSTRACT

The peripheral unit management system, the peripheral unit management method and the program recording medium therefore for managing a plurality of peripheral units by a peripheral unit manager via a network wherein each of the plurality of peripheral units has a serial number and a unique ID number to distinguish it from other peripheral units and is connected to the network for communication between the manager and the peripheral units, the system can reuse data having been accumulated in one of the peripheral units in which a LAN card has been replaced, thereby management of articles of consumption and maintenance of the peripheral unit can be properly accomplished.

In a management system 1 that manages a plurality of peripheral units 2-1 to 2-N via a local area network LAN 3, each peripheral unit having a serial number and a unique ID number, the system 1 communicates with each peripheral unit and reads the serial number and the ID number thereof, determines whether or not any one of the peripheral units has been replaced, when it is determined that a peripheral unit has been replaced the system obtains new data of the peripheral unit, when it is determined that a peripheral unit has not been replaced even though a LAN card of the peripheral unit has been replaced, the system reuses data having been accumulated in the peripheral unit.

8 Claims, 14 Drawing Sheets

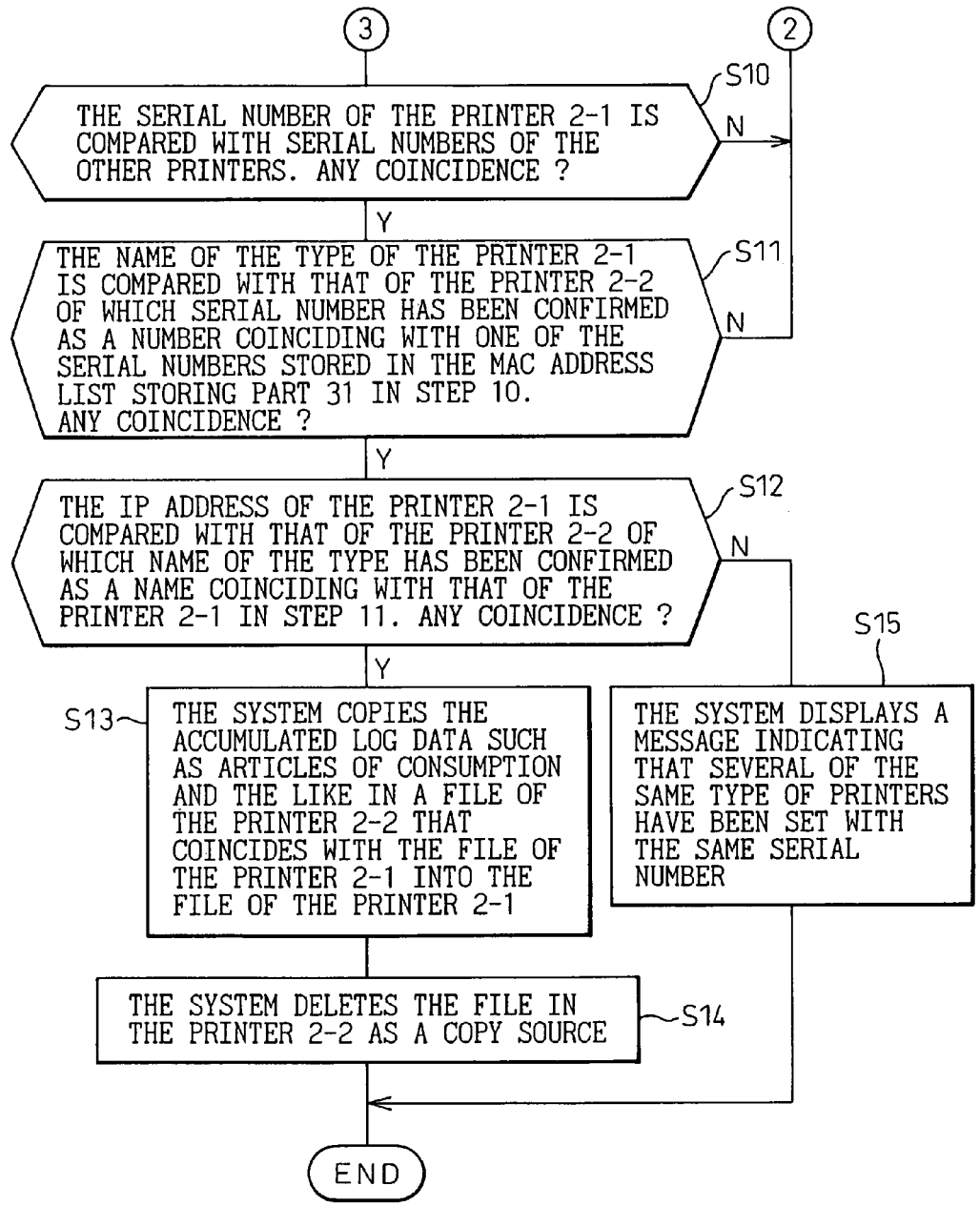

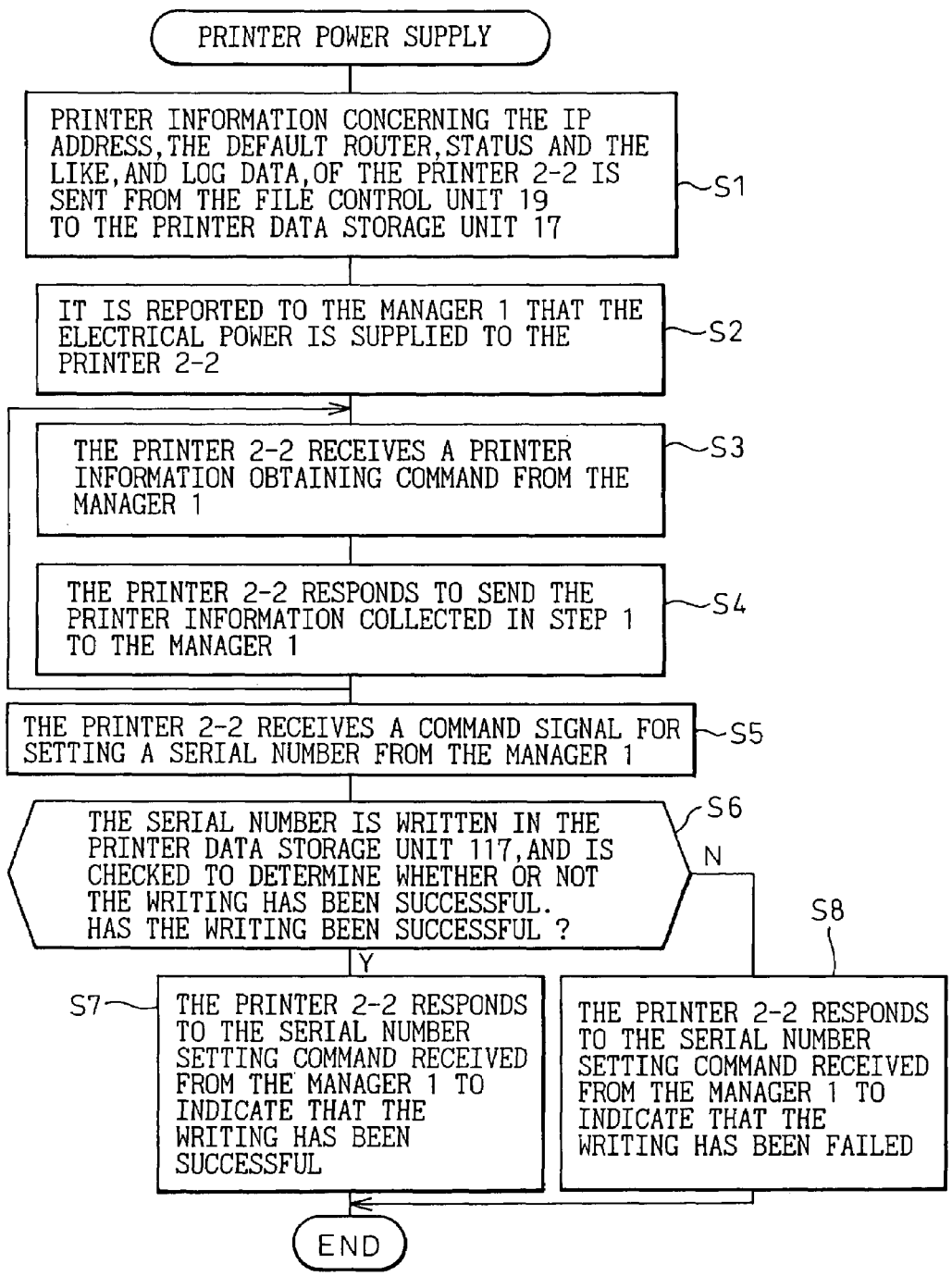

PERIPHERAL UNIT MANAGEMENT SYSTEM, METHOD AND PROGRAM RECORDING MEDIUM THEREFOR

BACKGROUND OF THE INVENTION

1. Field of the Invention

The present invention relates to a peripheral unit management system, a method and a program recording medium therefore, wherein a management system and a plurality of peripheral units are mutually connected via a local area network (LAN), the peripheral units being connected to the LAN with their respective LAN cards having a connecting function to the LAN, and the system can continually reuse previously accumulated data in the peripheral units before replacement of the LAN cards when only the LAN cards of the peripheral units have been replaced but the main bodies of the peripheral units have not been replaced.

2. Description of the Related Art

In general, a Mac address is used for distinguishing a unit connected to a LAN from other units connected to the LAN. The MAC address is unique data assigned to each unit connected to the LAN, thus each unit is required to have a MAC address. Since the Mac address is easy to handle, there are many systems connected to a LAN for managing a plurality of peripheral units, for example printers, wherein the MAC addresses are used as identifiers of the peripheral units, and data stored in the peripheral units are managed by the systems.

In normal use, when a system manages a plurality of printers, there are no problems in managing the printers with the use of the MAC addresses. However, when only a LAN card of one of the printers, which is inserted into the printer, has been replaced but a main body of the printer has not been replaced, the corresponding MAC address has also been changed because a MAC address having unique data has been set to the LAN card for distinguishing the card from other cards. Thus, the management system judges the printer to be another printer since the printer communicates with the management system via the newly replaced LAN card. As a result, when the system manages accumulated data such as articles of consumption, the number of printed sheets and the like, of the printer of which LAN card has been replaced, it becomes difficult to reuse data being accumulated in the printer before replacement of the LAN card.

SUMMARY OF THE INVENTION

In view of this, the purpose of the present invention is to solve the aforementioned problems and to provide a peripheral unit management system, a method and a program recording medium therefore, wherein the management system and a plurality of peripheral units are mutually connected via a local area network (LAN), the peripheral units being connected to the LAN with their respective LAN cards having a connecting function to the LAN, the system can reuse previously accumulated data in the peripheral units when only the LAN cards of the peripheral units have been replaced but main bodies of the peripheral units have not been replaced.

In order to solve the above-mentioned problems, according to the present invention, there is provided a peripheral unit management system for managing a plurality of peripheral units by a peripheral unit manager via a network wherein each of the plurality of peripheral units has a serial number and a unique ID number to distinguish it from other peripheral units and is connected to the network for communication between the manager and the peripheral units, comprising: a unit for determining whether or not one of the peripheral units has been replaced by communicating with the respective peripheral units and reading respective serial numbers and ID numbers of the peripheral units, and a unit for obtaining new data of a peripheral unit when the determining unit determines that the peripheral unit has been replaced, or reusing data being accumulated in the peripheral unit when the determining unit determines that the peripheral unit has not been replaced.

In the above peripheral unit management system, wherein each peripheral unit comprises a main body having a first recording medium that records a serial number and a board having a second recording medium that records an ID number, the board can be inserted to and removed from the body and performs a connecting function to the network thereby enabling it to transmit the serial number and the ID number over the network, and when the board is replaced, the management system reads the serial number and the ID number and determines whether or not the main body of the peripheral unit has been replaced or not.

In the above peripheral unit management system, wherein each peripheral unit comprises a main body not having a recording medium that records a serial number and a board having a first recording medium that records a serial number and a second recording medium that records an ID number, the board can be inserted to and removed from the body and performs a connecting function to the network thereby enabling it to transmit the serial number and the ID number over the network, and when the board is replaced, the management system reads the serial number after the serial number has been set by an operational panel either of its own or of the peripheral unit and reads the ID number of the peripheral unit, and determines whether or not the main body of the peripheral unit has been replaced.

In order to solve the above-mentioned problems, according to the present invention, there is provided a peripheral unit management method for managing a plurality of peripheral units by a peripheral unit manager via a network wherein each of the plurality of peripheral units has a serial number and a unique ID number to distinguish it from other peripheral units and is connected to the network for communication between the manager and the peripheral units, comprising the steps of: communicating with the respective peripheral units and reading respective serial numbers and ID numbers of the peripheral units, determining whether or not one of the peripheral units has been replaced based on the respective serial numbers and the ID numbers of the peripheral units, obtaining new data of a peripheral unit when it is determined that the peripheral unit has been replaced in the determining step, and reusing data being accumulated in another peripheral unit when it is determined that the peripheral unit has not been replaced in the determining step.

In the above peripheral unit management method, wherein each peripheral unit comprises a main body having a first recording medium that records a serial number and a board having a second recording medium that records an ID number, the board can be inserted to and removed from the body and performs a connecting function to the network thereby enabling it to transmit the serial number and the ID number over the network, and the method further comprising the steps of: reading the serial number and the ID number when the board is replaced, and determining whether or not the main body of the peripheral unit has been replaced or not.

In the above peripheral unit management method, wherein each peripheral unit comprises a main body not having a recording medium that records a serial number and a board having a first recording medium that records a serial number and a second recording medium that records an ID number, the board can be inserted to and removed from the body and performs a connecting function to the network thereby enabling it to transmit the serial number and the ID number over the network, and the method further comprising the steps of: reading the serial number and the ID number of the peripheral unit, after the serial number has been set by an operational panel either of its own or of the peripheral unit when the board is replaced, and determining whether or not the main body of the peripheral unit has been replaced.

In order to solve the above-mentioned problems, according to the present invention, there is provided a recording medium readable by a computer and used for a peripheral unit management method for managing a plurality of peripheral units by a peripheral unit manager via a network wherein each of the plurality of peripheral units has a serial number and a unique ID number to distinguish it from other peripheral units and is connected to the network for communication between the manager and the peripheral units, said medium having a program recorded thereon for making the computer execute the steps of: communicating with the respective peripheral units and reading respective serial numbers and ID numbers of the peripheral units, determining whether or not one of the peripheral units has been replaced based on the respective serial numbers and the ID numbers of the peripheral units, obtaining new data of a peripheral unit when it is determined that the peripheral unit has been replaced in the determining step, and reusing data being accumulated in another peripheral unit when it is determined that the peripheral unit has not been replaced in the determining step.

BRIEF DESCRIPTION OF THE DRAWINGS

The present invention will be more clearly understood from the description as set forth below with reference to the accompanying drawings, wherein:

FIG. 12 is a third part of a flowchart for controlling a printer manager according to a second aspect of the present invention;

FIG. 13 is a flowchart for controlling a printer according to a second aspect of the present invention;

DESCRIPTION OF THE PREFERRED EMBODIMENTS

Figure 1:
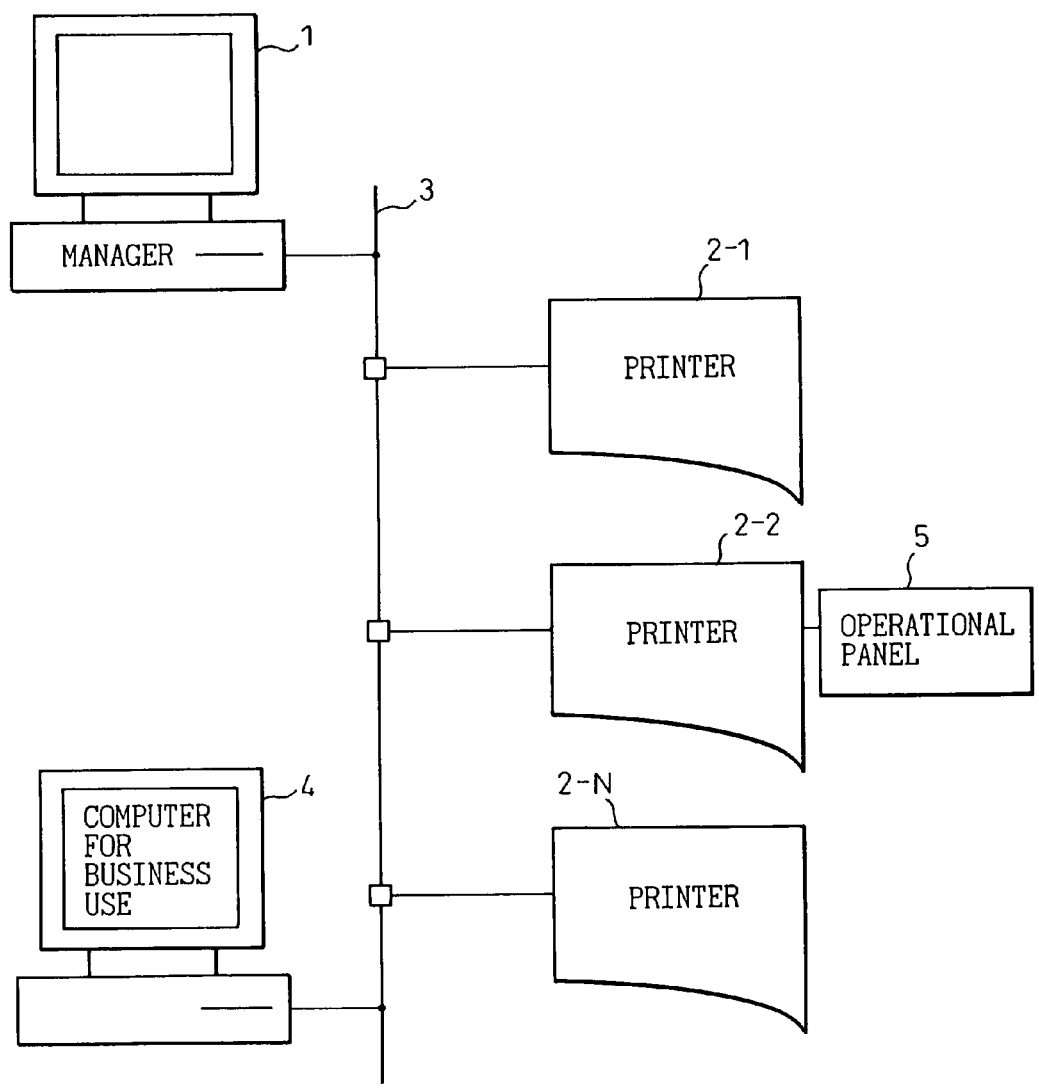
FIG. 1 is a schematic diagram of an embodiment of a peripheral unit management system according to the present invention.

The preferred embodiments of the present invention will be described in detail below with reference to the accompanying drawings. The same part will be indicated with the same reference numerals throughout the drawings.

FIG. 1 is a schematic diagram of an embodiment of a peripheral unit management system according to the present invention. The peripheral unit management system of the present invention includes a printer manager 1, a plurality, for example, N, of printers as peripheral units 2-1, 2-2, . . . , 2-N, and a computer 4 for business use. The manager 1, a plurality of printers 2-1, 2-2, . . . , 2-N, and the computer 4 are connected via a LAN 3. In FIG. 1, only one computer 4 is shown, but more of computers for business use may be normally connected to the LAN 3. For ease of understanding, only one communication line, namely, only LAN 3 is shown in FIG. 1, but a plurality of communication lines including at least one wide area network (WAN) can be used. Thus, the manager 1 can be connected to the plurality of printers 2-1, 2-2, . . . , 2-N via a first LAN, a WAN and a second LAN.

The manager 1 monitors states of the plurality of printers 2-1, 2-2, . . . , 2-N, regularly communicates with the printers, and manages accumulated data concerning articles of consumption of the printers, the number of pages printed by the printers and the like. The manager 1 has a function to set data, for example, serial numbers to printers.

Each of printers 2-1, 2-2, . . . , 2-N respectively performs a printing function as a normal business in response to each printing command transmitted from the computer 4.

An operational panel 5 is integrated with each of the printers and is also used for setting serial numbers of the printers.

A first embodiment according to the present invention will be described below.

Figure 2:
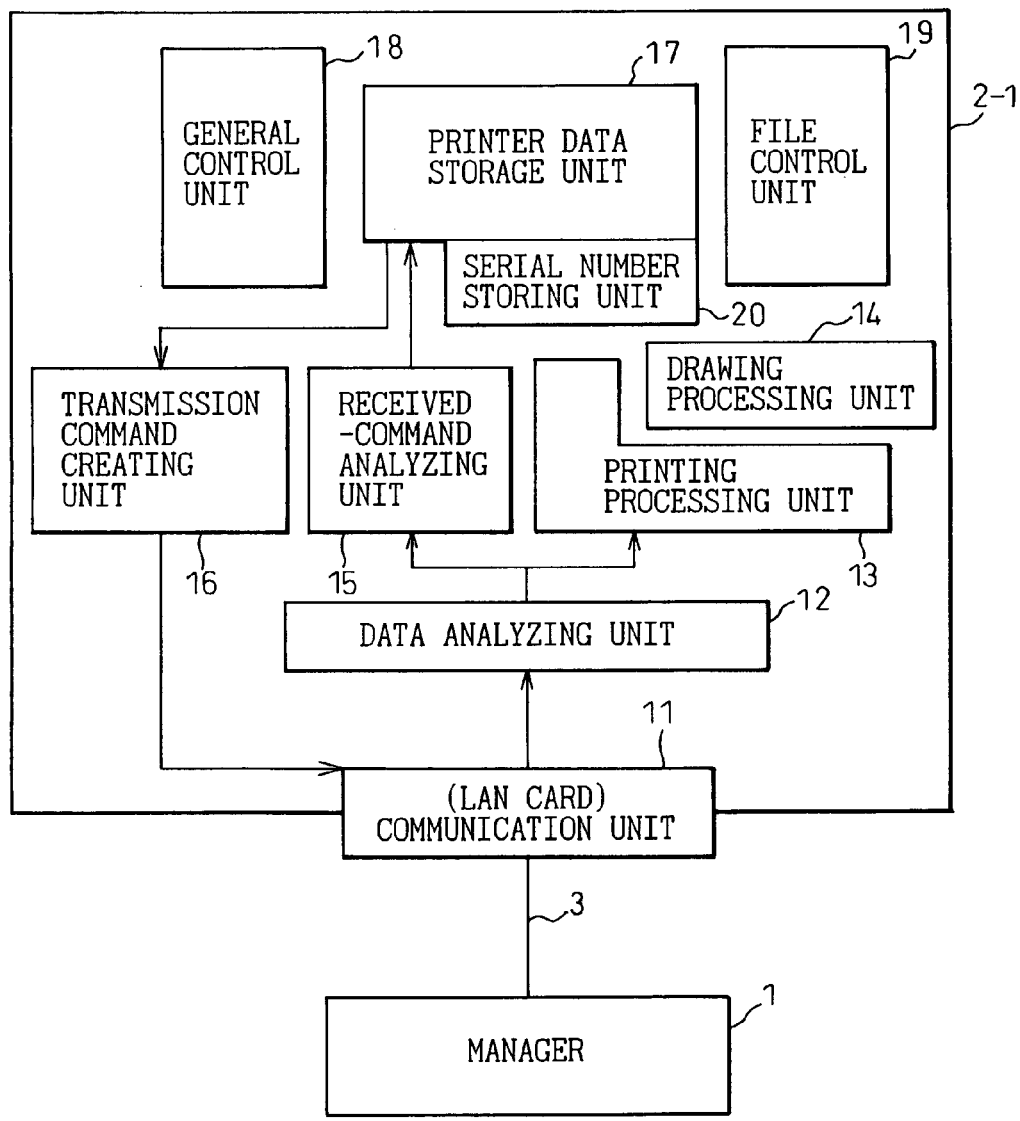
FIG. 2 is a schematic diagram of an embodiment of a printer according to a first aspect of the present invention.

FIG. 2 is a schematic diagram of an embodiment of a printer according to a first aspect of the present invention. A printer 2-1 shown in FIG. 2 is the one connected to the LAN 3, as can be seen in FIG. 1. The system configuration of the printer 2-1 will be described below. As shown in FIG. 2, the printer 2-1 has a medium for storing the serial number thereof inside the printer.

A communication unit 11 having a LAN card has a function to communicate with other units connected to the LAN 3.

A data-analyzing unit 12 analyzes received data.

A printing-processing unit 13 performs real printing processes, controls the setting of paper feeding speed and the amount of toner, and the like.

A drawing-processing unit 14 performs to develop printing data into bitmap data.

A received-command-analyzing unit 15 is used for analyzing received commands.

A transmission-command-creating unit 16 is used for creating commands for transmission.

A printer data storage unit 17 stores data necessary for managing the printer.

A general control unit 18 controls all necessary operations of the printer.

A file control unit 19 stores system data and the like of the printer.

A serial number storing unit 20 is made of a flash memory to store the serial number of the printer.

According to normal management by a printer manager, Mac addresses are used as identifiers in order to distinguish a printer from other printers based on various communication protocol. In this circumstances, when a LAN card in a printer has been replaced due to a failure of the printer, the manager compares the Mac address of the LAN card with serial numbers of printers that have been previously registered to the manager, thereby determining whether the printer with the LAN card is the one to be additionally managed for the future or the one having been managed and of which LAN card has only been replaced. Herein, each serial number is provided to each unit such as printers by manufacturers for management, thereby making it possible to distinguish a unit from other units. Each serial number is a unique number assigned to each unit.

In case the manager confirms that only a Mac address has been changed in a printer, the manager recognizes that the printer has not been replaced even though the Mac address of a LAN card in the printer has been changed, automatically reuses a file of accumulated information of the printer having been stored in the manager, as the information for the new Mac address. By doing so, under a circumstance in which a printer vendor collectively manages printer environment of users through a printer manager, supplies articles of consumption and provides maintenance services, the vendor can avoid troubles in such a way that the vendor can supply a proper amount of articles of consumption to printers because it does not misjudge that a new printer has been added when only a LAN card has been replaced in one of the printers, and that the vendor can avoid unnecessarily dispatching a maintenance serviceman when a trouble has occurred based on information received from a printer manager because the vendor can access the printer information having been accumulated before the replacement of the LAN card.

Figure 3:
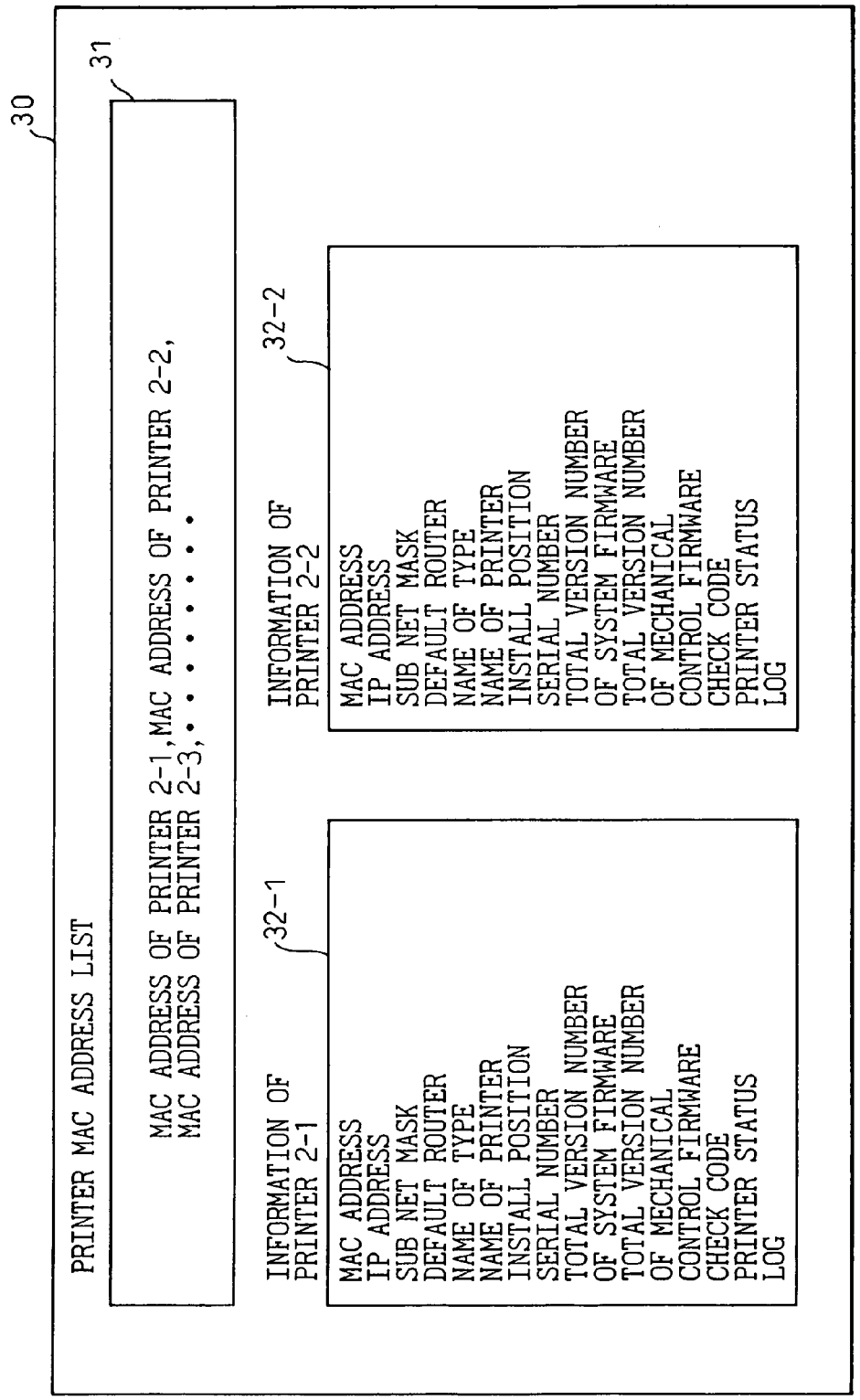
FIG. 3 is a detailed drawing showing a storing unit in a printer manager according to the present invention.

FIG. 3 is a detailed drawing showing a storing unit in a printer manager according to the present invention. In a store 30 of the manager 1 of a plurality (N) of printers 2-1, 2-2, ..., 2-N, a Mac address list storing part 31 for storing Mac addresses of all the printers connected to the LAN 3 and printer information storing parts 32-1, 32-2, ..., 32-N for storing information of the printers 2-1, 2-2, ..., 2-N. In each printer information storing part 32, data concerning a Mac address, an IP address, a subnet mask, a default router, a type, a printer name, an install position, a serial number, a total version number of system firmware, a total version number of mechanical control firmware, a check code, a printer status and log are stored.

Figure 4:
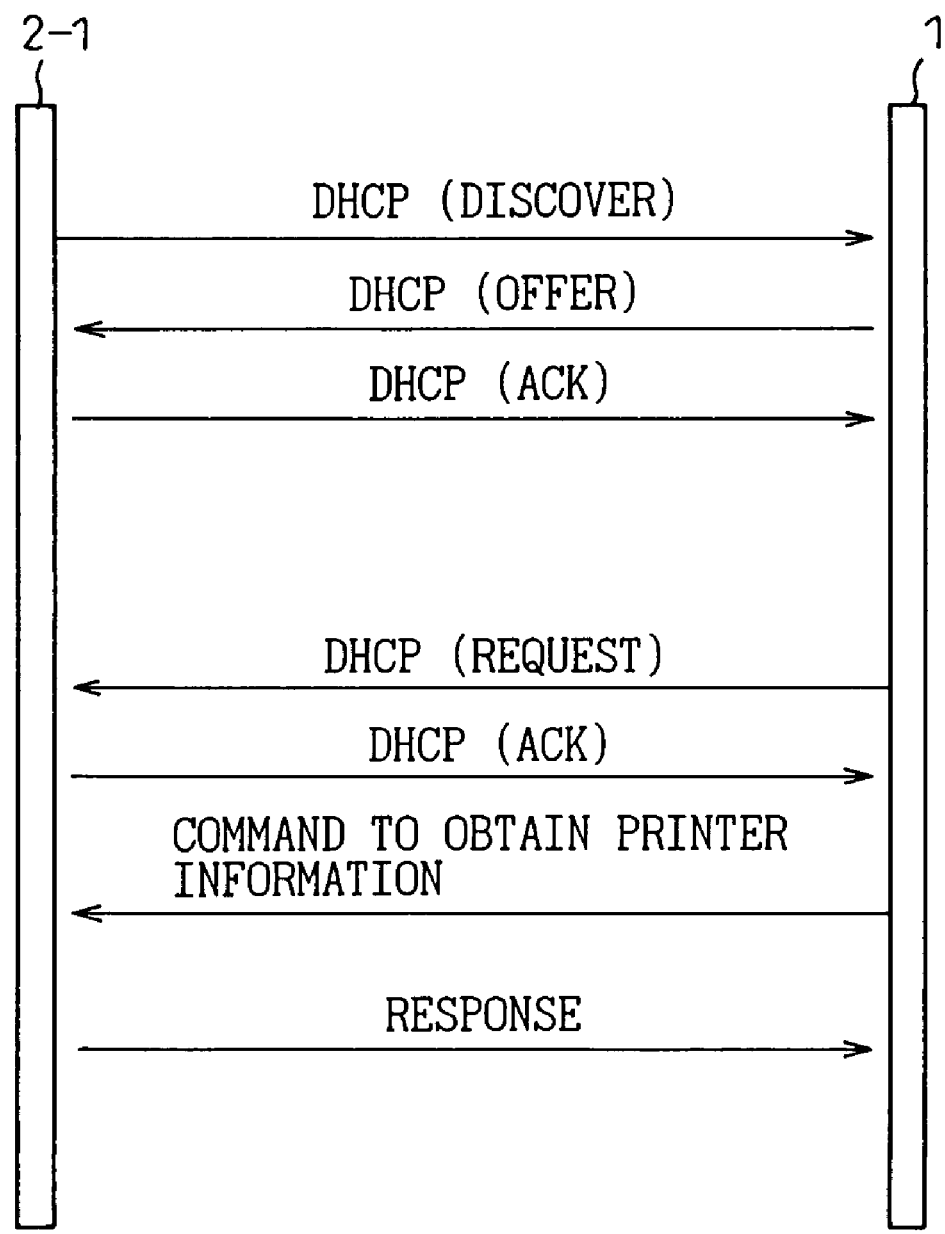
FIG. 4 is an explanatory drawing of the communication protocol between a printer manager and a printer according to the present invention.

FIG. 4 is an explanatory drawing of the communication protocol between a printer manager and a printer according to the present invention. Communication between the manager 1 and the printer 2-1 shown in FIG. 1 when the electrical power is supplied to the printer 2-1, is performed by the protocol DHCP for assigning the IP address.

First, the protocol DHCP (Discover) indicating that the printer is activated by the power supply is transmitted from the printer 2-1 to computers connected to the LAN 2 including the manager 1. Then, DHCP (Offer) reporting the confirmation of the power supply to the printer 2-1 is transmitted from the manager 1 to the printer 2-1. After receiving the DHCP (Offer), DHCP (Ack) indicating that the power supply has been confirmed and that the printer has been ready for assigning an IP address is transmitted from the printer 2-1 to the manager 1. The manager 1 judges whether or not the IP address has been set in the printer 2-1.

Since the DHCP includes the Mac address, the manager 1 can judge whether or not the Mac address of the printer 2-1 has been set. In only case of IPO, that is, the case when the IP address has not been set, the assignment for the IP address is performed as shown in the drawing as below. That is a DHCP (Request) indicating requirement for the IP assignment is sent from the manager 1 to the printer 2-1, then a DHCP (Ack) indicating confirmation of the completion of the IP assignment is sent from the printer 2-1 to the manager 1.

After completion of the communication process when the electric power is supplied to the printer, a normal process begins between the manager 1 and the printer 2-1. That is, a command to obtain printer information is sent from the manager 1 to the printer 2-1. After receiving the command, the printer 2-1 responds to send data stored in the printer data storage unit 17 to the manager 1 in which data include a serial number, an IP address, a default router, a printer status and the like of the printer 2-1 and log. The manager 1 stores the data in the printer information storing parts 32-1.

Figure 5:
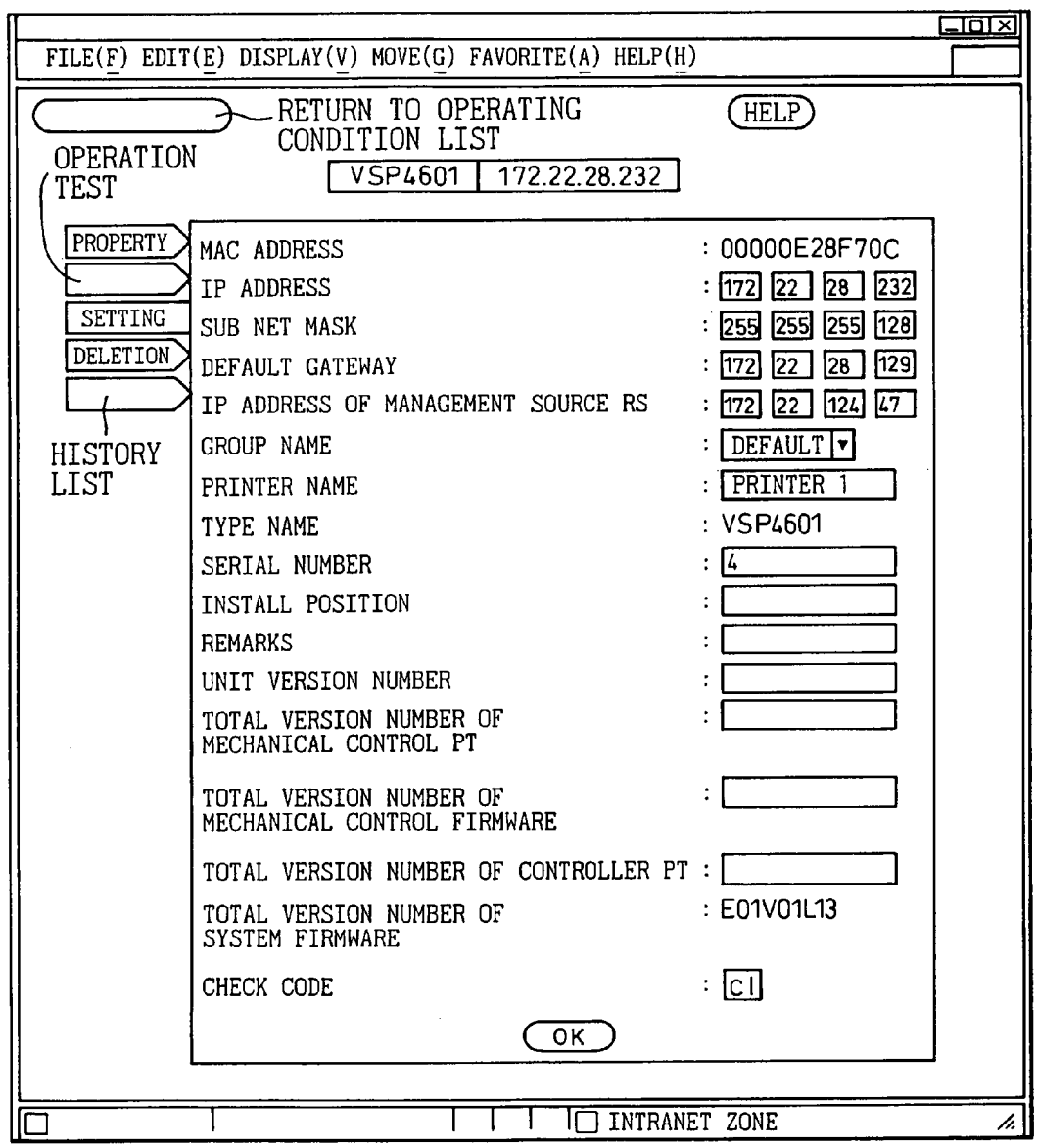
FIG. 5 is a drawing showing a screen for data setting of a printer manager according to the present invention.

FIG. 5 is a drawing showing a screen for data setting of a peripheral unit manager according to the present invention. As can be seen in FIG. 5, the screen is operated under the Internet Explorer provided by Microsoft Corporation with the use of Windows operating system. Mac addresses, types and total version numbers of system firmware are constant data previously set. Other data such as IP addresses, subnet masks, default gateways, IP addresses of a management source RS, group names, printer names, install positions, serial numbers, remarks, total version numbers of system, total version numbers of mechanical control Pt plate, total version numbers of mechanical control firmware, total version numbers of controller Pt plate and check codes are variable data. From FIG. 5, it is understood that the serial number can be set from the operational screen. The detailed explanation of other settings will be omitted since those setting are known to a person with ordinary skills in the printing art.

Hereinafter, referring to a flowchart shown by FIGS. 6 to 8, a control flow of a manager and a printer according to a first aspect of the present invention will be explained.

Figure 6:
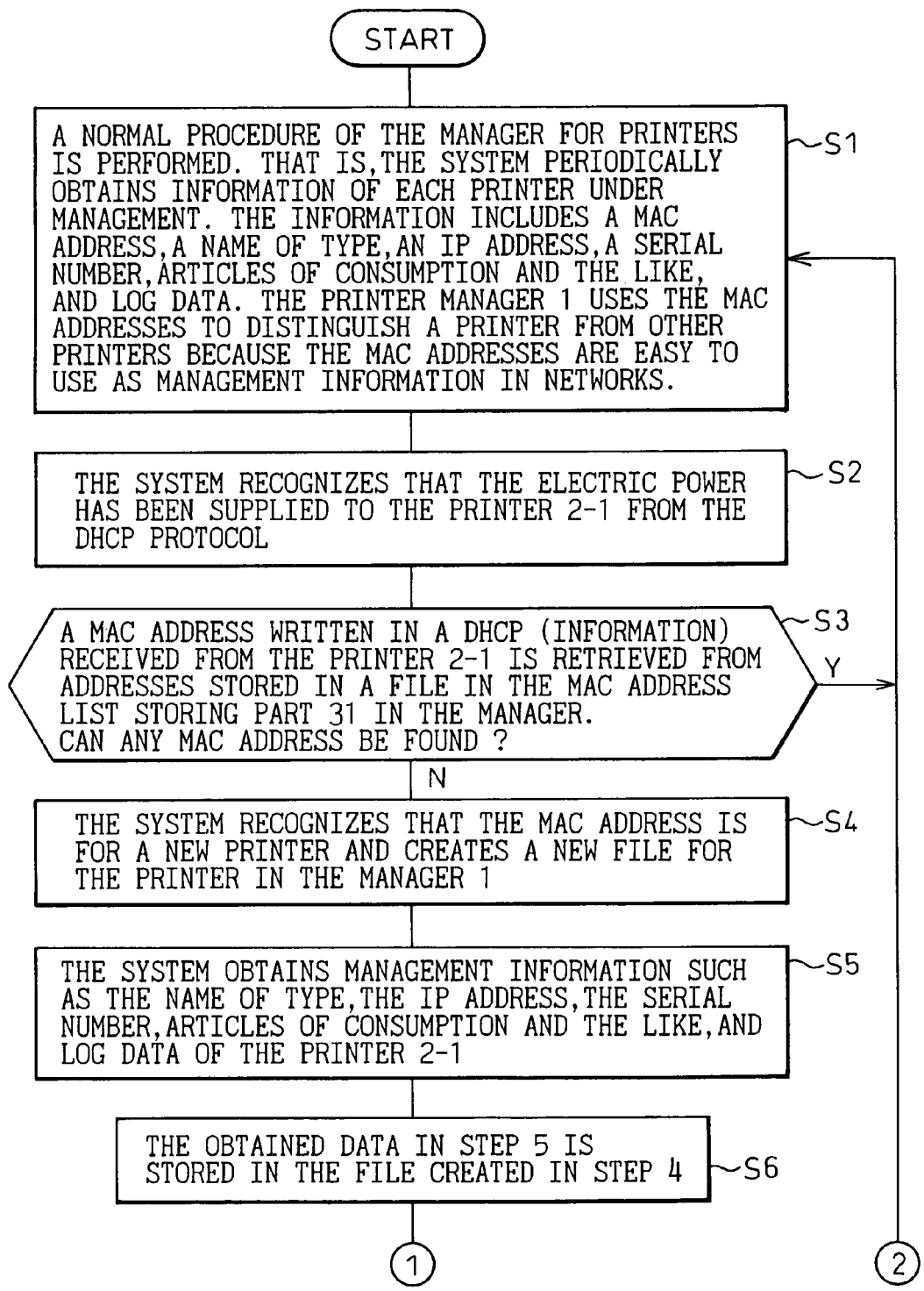
FIG. 6 is the former half part of a flowchart for controlling a printer manager according to a first aspect of the present invention.
Figure 7:
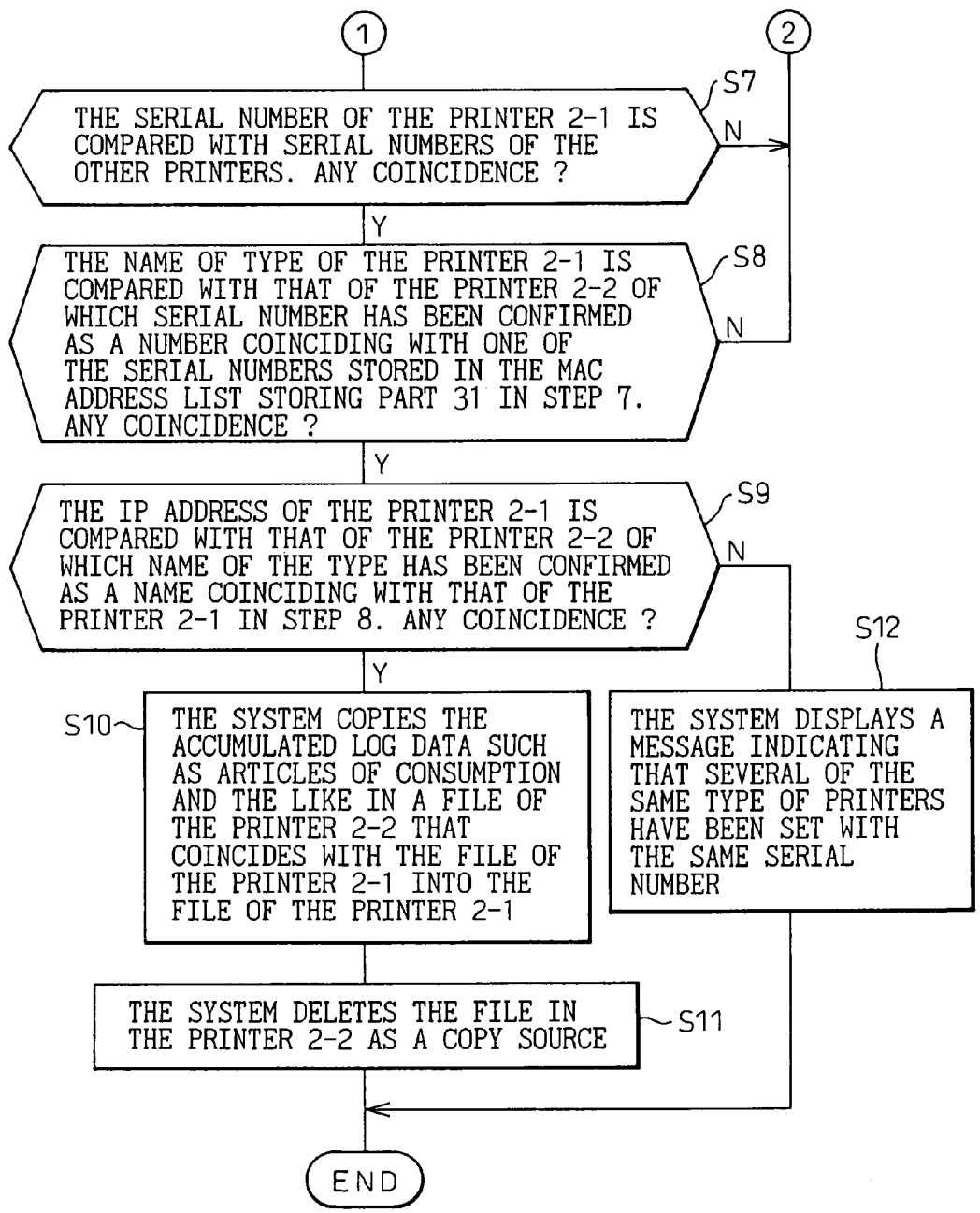
FIG. 7 is the latter half part of a flowchart for controlling a printer manager according to a first aspect of the present invention.

FIGS. 6 and 7 show a flowchart for controlling a printer manager according to a first aspect of the present invention. FIG. 6 is the former half part of the flowchart and FIG. 7 is the latter half part of the flowchart.

First, in step 1, a normal procedure of the manager for printers is performed. That is, the system periodically obtains information of each printer under management. The information includes a Mac address, a name of type, an IP address, a serial number, articles of consumption and the like, and log data. The printer manager 1 uses the Mac addresses to distinguish a printer from other printers because the Mac addresses are easy to use as management information in networks.

In step 2, the system recognizes that the electric power has been supplied to the printer 2-1 from the DHCP protocol.

In step 3, a Mac address written in a DHCP (information) received from the printer 2-1 is retrieved from addresses stored in a file in the manager 1, namely, the Mac address list storing part 31 as shown in FIG. 3. If the result is affirmative, namely, if the Mac address can be found, the system returns to step 1. If the result is negative, namely, if the Mac address cannot be found, the system proceeds to step 4.

In step 4, the system recognizes that the Mac address is for a new printer and creates a new file for the printer in the manager 1.

In step 5, the system obtains management information such as the name of type, the IP address, the serial number, articles of consumption and the like, and log data of the printer 2-1.

In step 6, the obtained data in step 5 is stored in the file created in step 4.

Then, in step 7, the serial number of the printer 2-1 is compared with serial numbers of the other printers. If there is a coincidence in these numbers, the system judges that any printer has not been replaced and proceeds to step 8. If there is not any coincidence in these numbers, the system judges that a printer was replaced when the LAN card was replaced, and returns to step 1.

In step 8, the name of type of the printer 2-1 is compared with that of the printer 2-2 of which serial number has been confirmed as a number coinciding with one of the serial numbers stored in the Mac address list storing part 31 in step 7. If there is a coincidence in the name of the type, the system judges that any printer has not been replaced and proceeds to step 9. If there is not coincidence in the name of the type, the system judges that a printer was replaced when the LAN card was replaced, and returns to step 1.

In step 9, the IP address of the printer 2-1 is compared with that of the printer 2-2 of which name of the type has been confirmed as a name coinciding with that of the printer 2-1 in step 8. If there is a coincidence in these IP addresses, the system judges that any printer has not been replaced and proceeds to step 10. If there is no coincidence in these IP addresses, the system judges that a printer was replaced when the LAN card was replaced, and proceeds to step 12.

In step 10, the system copies the accumulated log data such as articles of consumption and the like in a file of the printer 2-2 that coincides with the file of the printer 2-1 into the file of the printer 2-1.

In step 11, the system deletes the file in the printer 2-2 as a copy source.

In step 12, the system displays a message indicating that several of the same type of printers have been set with the same serial number. In this case, if the operator set the IP address of the printer 2-2 so that it coincides with that of the printer 2-1, afterward the result of step 9 becomes always affirmative, thus accumulated data in the printer 2-2 can be copied into the printer 2-1 in step 10.

Figure 8:
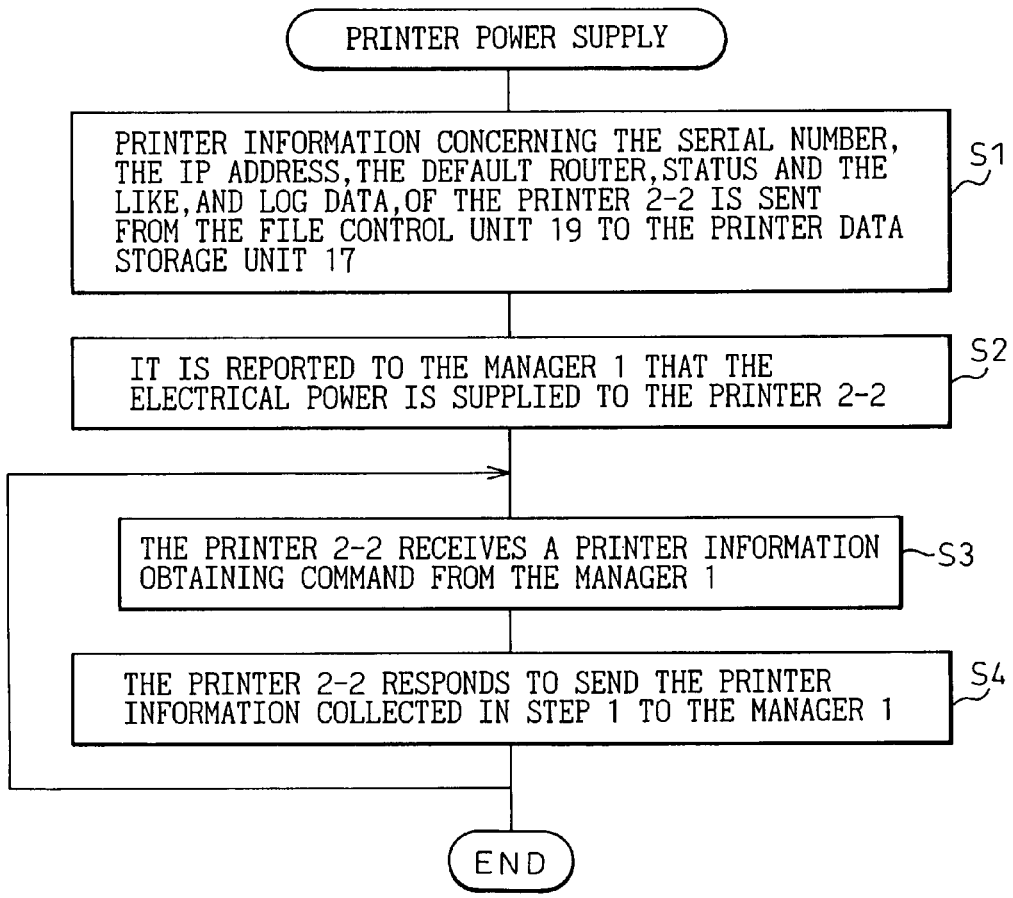
FIG. 8 is a flowchart for controlling a printer according to a first aspect of the present invention.

FIG. 8 is a flowchart for controlling a printer according to a first aspect of the present invention. The control routine starts, for example, by supplying the electrical power to the printer 2-2. When the power is supplied to the printer 2-2, the communication protocol DHCP (Discover) is sent from the printer 2-2 to the manager 1.

In step 1, printer information is sent from the file control unit 19 to the printer data storage unit 17.

In step 2, it is reported that the electrical power is supplied to the printer 2-2 by executing the process of DHCP (Discover, Offer and Acknowledgement) as explained in FIG. 4.

In step 3, the printer 2-2 receives a printer information obtaining command from the manager 1.

In step 4, after receiving the command in step 3, the printer 2-2 responds to send data to the manager 1 concerning the serial number, the IP address, the default router, status and the like, and log data, of the printer 2-2. The management system 1 stores these data log in the printer data storage unit 17 after receiving these log data.

The above steps 3 and 4 are periodically and repeatedly executed.

A second embodiment according to the present invention will be described below.

Figure 9:
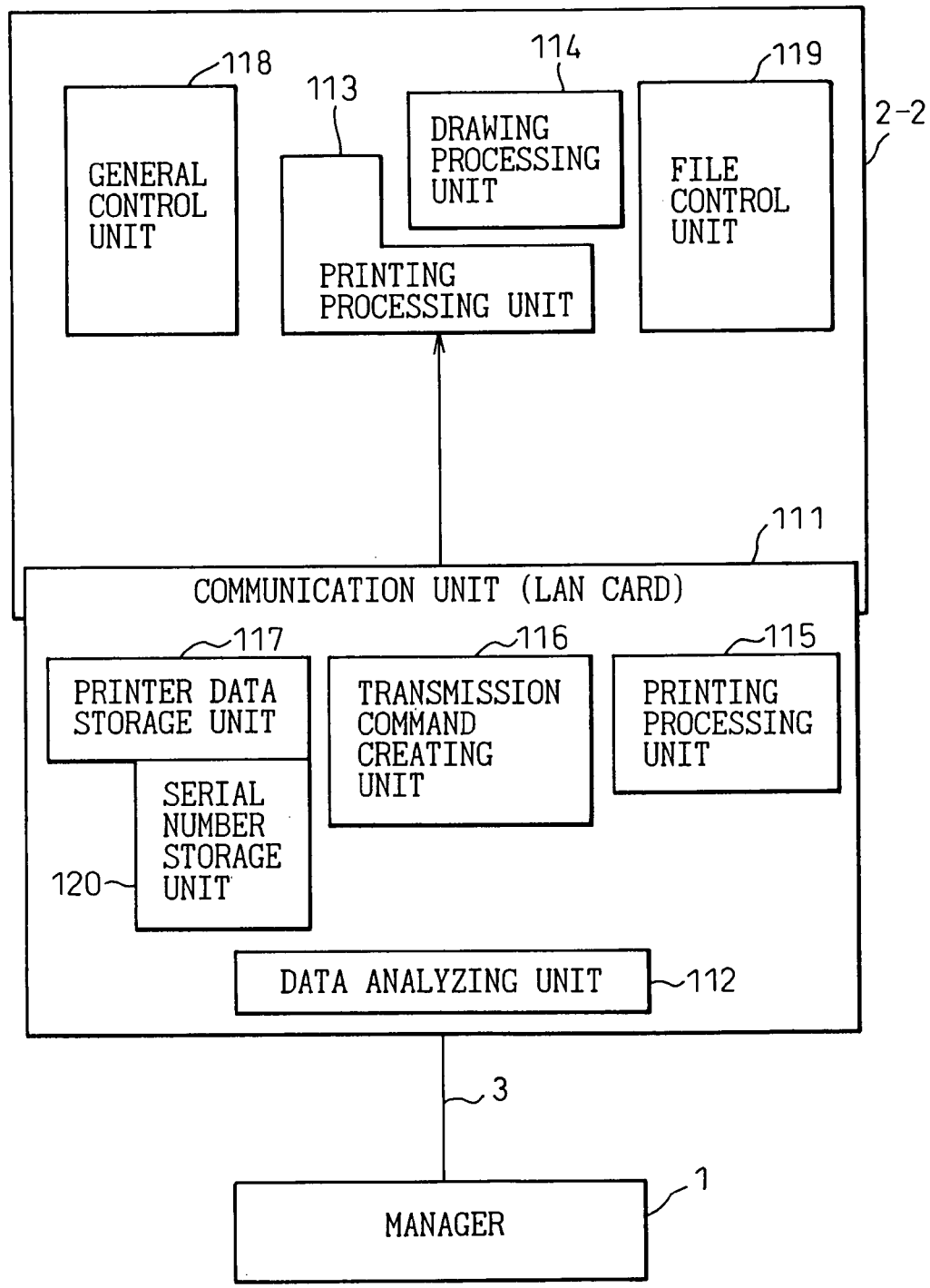
FIG. 9 is a schematic diagram of an embodiment of a printer according to a second aspect of the present invention.

FIG. 9 is a schematic diagram of an embodiment of a printer according to a second aspect of the present invention. The printer 2-2 shown in FIG. 9 is connected to the LAN 3 as shown in FIG. 1. The printer 2-2 does not have a function to hold a serial number inside the unit, but holds the serial number in the LAN card inserted in the printer 2-2. The system configuration of the printer 2-2 will be described below.

A communication unit 111 having a LAN card has a function to communicate with other units connected to a LAN.

A data-analyzing unit 112 analyzes received data.

A printing-processing unit 113 performs real printing processes, controls the setting of paper feeding speed and the amount of toner, and the like.

A drawing-processing unit 114 performs to develop printing data into bitmap data.

A received-command-analyzing unit 115 is used for analyzing received commands.

A transmission command creating unit 116 is used for creating commands for transmission.

A printer data storage unit 117 stores data necessary for managing the printer.

A general control unit 118 controls all the necessary operations of the printer.

A file control unit 119 stores system data and the like of the printer.

A serial number storing unit 120 is made of a flash memory to store the serial number of the printer.

In accordance with the same reasons as explained in the description of the first aspect of the invention, Mac addresses are used for normal printer management. However, as the printer 2-2 does not have a medium to hold a serial number inside the unit, the serial number is held in a medium in the LAN card inserted in the printer. Such embodiment happens in a case when a printer and a LAN card therefore have been designed by different vendors.

In this case, it is necessary to provide a means for setting the serial number either from an operational panel of the printer or the manager to a write enable recording medium such as a flash ROM or the like in the LAN card because serial numbers to be assigned to printers cannot be determined at the time the LAN cards are shipped. This number setting is accomplished when the printer with the LAN card is installed at the customer site.

In order to avoid erroneous inputs of the serial numbers, check code are previously assigned to respective printers. Then, the check code is input with the serial number for the setting, and check sum is proceeded based on the serial number and the check code. The printer or the manager judges whether or not the setting was appropriate.

When a LAN card is replaced in a printer of which serial number has been set in the LAN card as explained above, the manager recognizes the replacement of the LAN cards in accordance with the following procedure.

(1) A LAN card is replaced. At this time a serial number has not yet been input in the new LAN card, so the manager identifies printers based on Mac addresses only, and recognizes that a new printer has been added. Then, the manager displays a printer as another new printer on the screen.

(2) The serial number is input from the printer panel or the manager into the LAN card, the manager compares the serial number input to the LAN card with a serial number of the printer having been stored in the manager.

(3) As a result of the comparison, when these numbers agree, the manager recognizes that the printer has not been replaced even though the Mac address of the LAN card has been changed, and reuses accumulated information of the printer having been stored in the manager at the storing location of the new Mac address.

(4) As a result of the comparison, when these numbers do not agree, the manager recognizes that the printer has been replaced and begins to manage the new printer.

In accordance with the procedure explained above, even in case that the serial number is not held inside the unit, but held in a medium in the LAN card, under a circumstance in which a printer vendor collectively manages printer environment of users through a printer manager, supplies articles of consumption and provides a maintenance service, the vendor can avoid troubles as follows. That is, the vendor can supply proper amount of articles of consumption to printers because it does not misjudge that a new printer has been added when only a LAN card has been replaced in any of the printers. Furthermore, the vendor can avoid unnecessarily dispatching a maintenance serviceman when a trouble occurred based on information received from a printer manager because the information does not reflect information before the replacement of a LAN card of a printer caused the trouble.

Hereinafter, by referring to a flowchart shown by FIGS. 10 to 13, a control flow of a manager and a printer according to a second aspect of the present invention will be explained.

Figure 10:
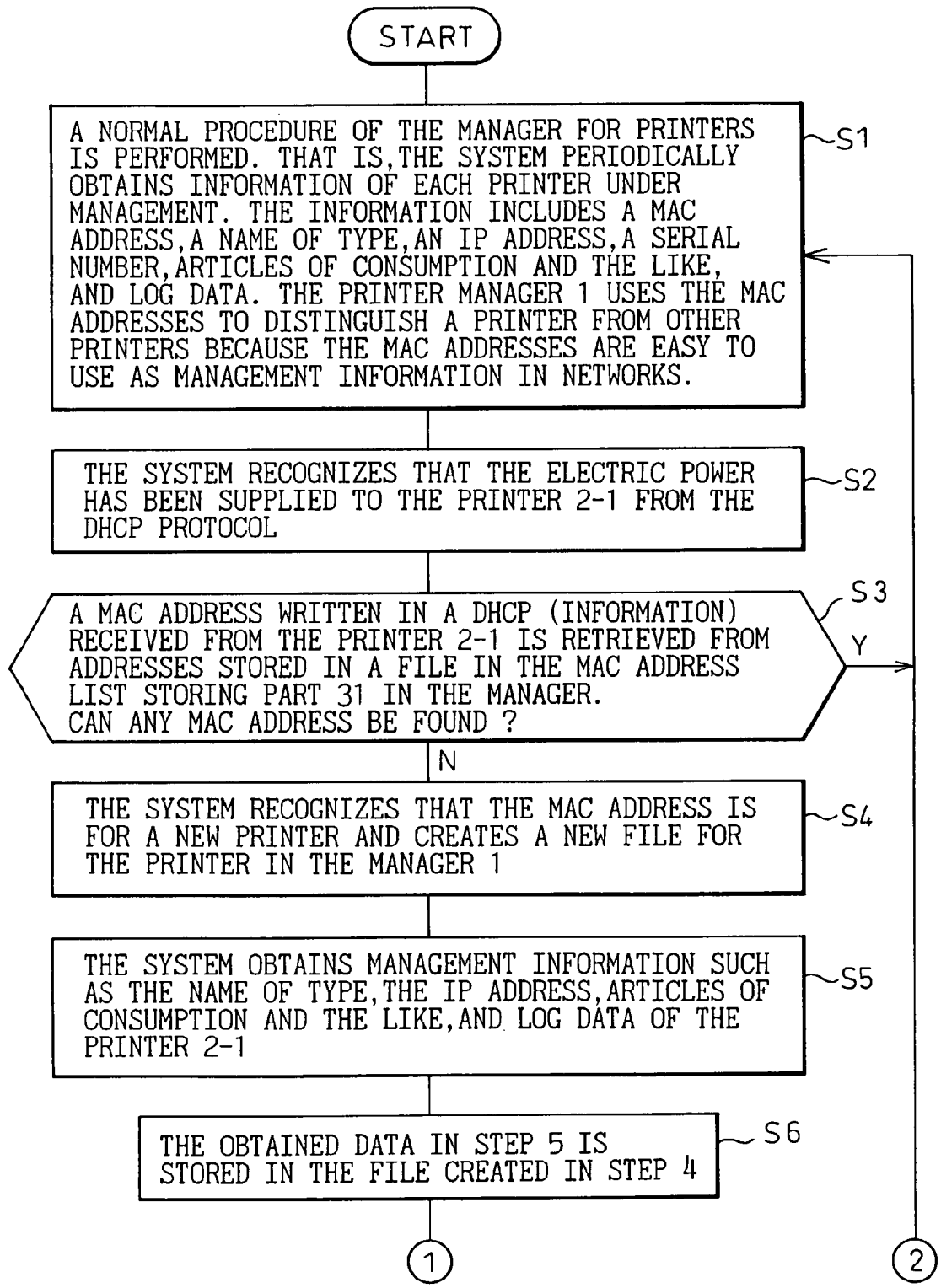
FIG. 10 is a first part of a flowchart for controlling a printer manager according to a second aspect of the present invention.
Figure 11:
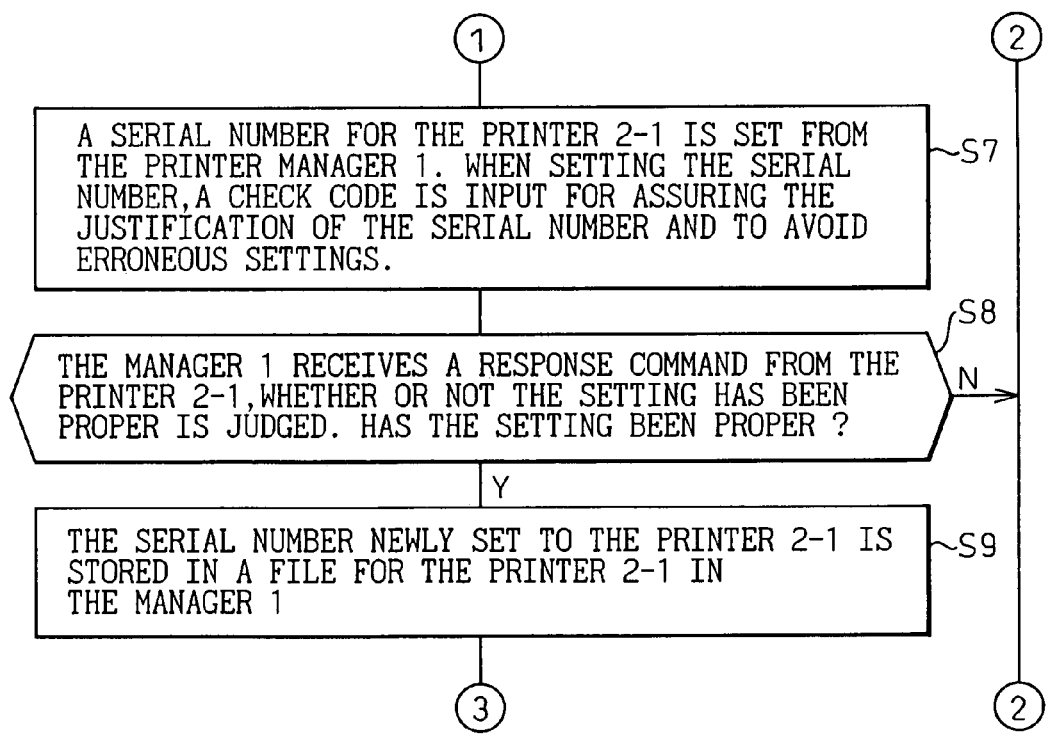
FIG. 11 is a second part of a flowchart for controlling a printer manager according to a second aspect of the present invention.

FIGS. 10 to 12 are a flowchart for controlling a printer manager according to a second aspect of the present invention in which FIG. 10 shows a first part, FIG. 11 shows a second part and FIG. 12 shows a third part of the flowchart.

As steps 1 to 6 shown in FIG. 10 correspond to steps 1 to 6 shown in FIG. 6 and Steps 10 to 15 shown in FIG. 12 correspond to steps 7 to 12 shown in FIG. 7, the explanation of these steps will be omitted. Therefore, only steps 7 to 9 shown in FIG. 11 will be explained below.

In step 7, a serial number for the printer 2-1 is set from the printer manager 1. When setting the serial number, a check code is input for assuring the justification of the serial number and to avoid erroneous settings.

In step 8, the manager 1 receives a response command from the printer 2-1, whether or not the setting has been proper is judged. If the result is affirmative, the process proceeds to step 9. If the result is negative, the process returns to step 1.

In step 9, the serial number newly set to the printer is stored in a file for the printer 2-1 in the manager 1. That is, as it is confirmed that the new serial number has been properly set in step 8, the serial number is written in the corresponding file in step 9.

FIG. 13 is a flowchart for controlling a printer according to a second aspect of the present invention.

As steps 1 to 4 shown in FIG. 13 correspond to steps 1 to 4 shown in FIG. 8, the explanation of these steps will be omitted. Therefore, only steps 5 to 8 shown in FIG. 13 will be explained below.

In step 5, the printer 2-2 receives a command signal for setting a serial number from the manager 1.

In step 6, the serial number is written in the printer data storage unit 117. If the writing was successful in step 6, the system proceeds to step 7. If the writing failed in step 6, the system proceeds to step 8.

In step 7, the printer 2-2 responds to the serial number setting command received from the manager 1 to indicate that the writing has been successful.

In step 8, the printer 2-2 responds to the serial number setting command received from the manager 1 to indicate that the writing has been failed.

Hereinafter, a program record medium readable by computers according to the present invention will be explained. The program recorded on the medium of the present invention makes a computer execute a method for managing a plurality of peripheral units wherein a peripheral unit manager and a plurality of peripheral units are mutually connected via a local area network (LAN), and have a serial number and a unique ID number that distinguishes each unit from other units. Another program recorded on a record medium of the present invention makes a computer execute a method comprising the steps of reading a serial number and an ID number of a peripheral unit by means of communication between the manager and the plurality of peripheral units, judging whether or not the peripheral unit has been replaced, obtaining data of the new peripheral unit if it is judged that the unit has been replaced, and reusing data accumulated of the peripheral unit before replacement if it is judged that the peripheral unit has not been replaced.

Figure 14A:
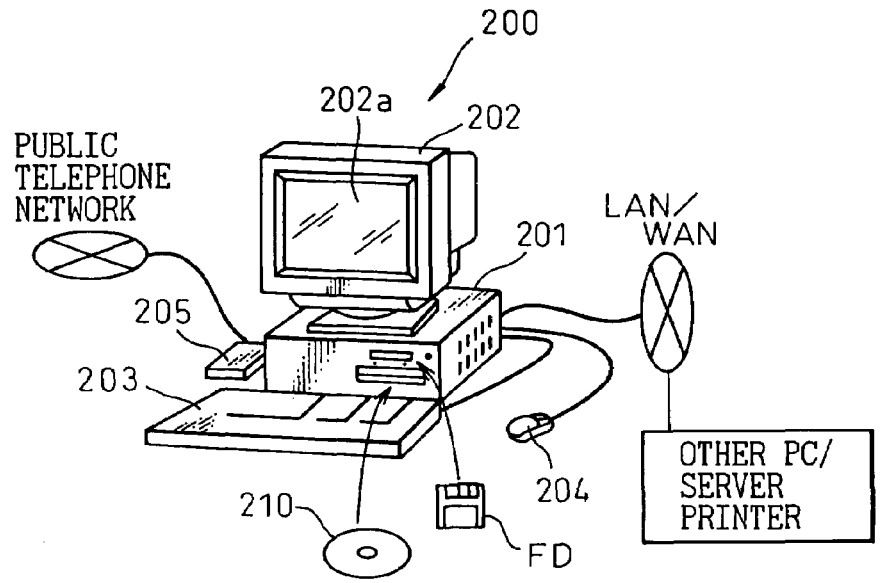
FIG. 14A is a schematic drawing showing a general structure for explaining a relationship between a peripheral unit manager in a peripheral unit management system and a program recording medium according to the present invention.
Figure 14B:
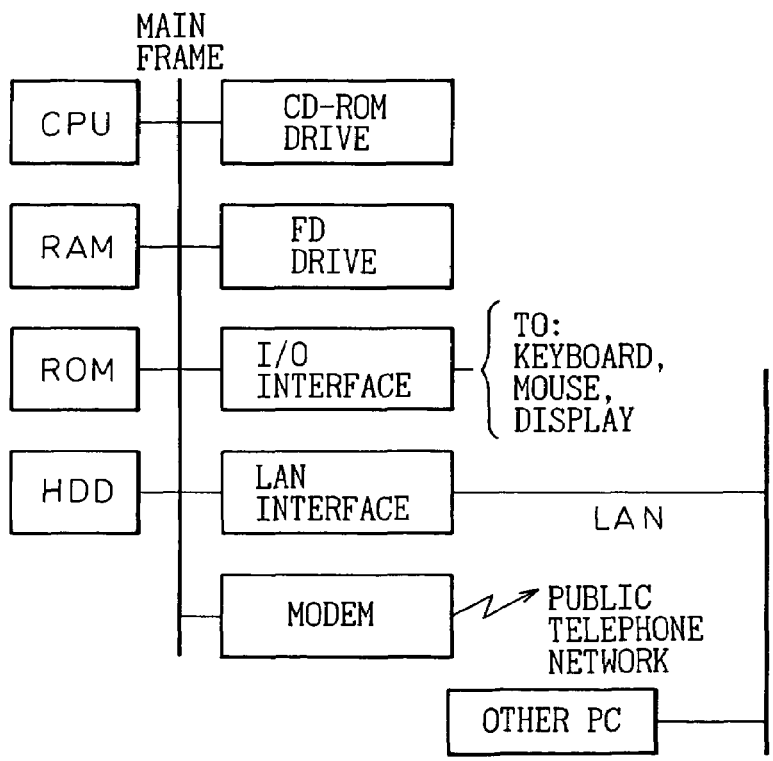
FIG. 14B is a schematic diagram showing an internal structure of a main frame of the peripheral unit manager shown in FIG. 14A.

FIG. 14A is a schematic drawing showing a general structure for explaining a relationship between a peripheral unit manager in a peripheral unit management system and a program recording medium according to the present invention; and FIG. 14B is a schematic diagram showing an internal structure of a main frame of the peripheral unit manager shown in FIG. 14A.

The peripheral unit manager 200 as a computer system shown in FIG. 14A, as shown in FIG. 14B, comprises a main frame 201 having a CPU, a disk drive and the like in the frame. The manager 200 also comprises a display unit 202 for displaying characters and images on a screen 202a under the directions of the main frame 201, a keyboard 203 for inputting various data to the manager 200, a mouse 204 for specifying a position on the screen 202a, and a LAN interface or a modem for connecting other computers via networks and enabling to access to databases stored in the computers.

Programs according to the present invention can be recorded by means of a CD-ROM 210, a flexible disk FD, a digital video disk DVD, a photo magnetic disk, an IC card or the like, which are portable recording mediums or a database storage in a computer, connected to the manager 200 via networks. The programs are installed into a hard disk HD in the manager 200 from the portable recording mediums or the database storage, and normally kept in the HD. After the installation of the programs into the hard disk HD, the CPU of the manager 200 loads the programs from the HD into a RAM in the manager 200 as required, and executes the programs. Of course, an operator may directly write the programs into the RAM in the manager 200 by using an input means such as the keyboard.

As heretofore explained, according to the peripheral unit management system, the peripheral unit management method and the program recording medium therefore of the present invention, wherein a peripheral unit manager manages a plurality of peripheral units, the system can reuse data having been accumulated in any of the peripheral units in which a LAN card has been replaced, thereby management of articles of consumption and maintenance of the peripheral unit can be appropriately accomplished.

It will be understood by those skilled in the art that the foregoing descriptions are preferred embodiments of the disclosed system, method or recording medium that various changes and modifications may be made in the invention without departing from the spirit and scope thereof.

What is claimed is:

1. A peripheral unit management system to manage a plurality of peripheral units using a peripheral unit manager via a network, wherein the peripheral unit manager stores property information and address information corresponding to each peripheral unit, comprising:
   a reading unit reading the property information and the address information from each of the peripheral units;
   a determining unit determining that one of the peripheral units has been replaced when the property information read does not coincide with the property information stored in the peripheral unit manager, and when detecting that the address information of one of the peripheral units is new, and
   an obtaining unit obtaining the new address information of the one of the peripheral units when the determining unit determines that the one of the peripheral units has been replaced, and, when the property information read does not coincide with the property information stored in the peripheral unit manager, storing the property information read and the new address information of the one of the peripheral units, and when the property information read does coincide with the property information stored in the peripheral unit manager, storing data being accumulated in for the peripheral unit with the new address information of the one of the peripheral units after setting the property information to correspond to the new address information.

2. The peripheral unit management system according to claim 1, wherein each peripheral unit comprises:
   a main body having a first recording medium to record the property information, and
   a board having a second recording medium to record the address information, wherein the board is inserted to and removed from the main body and performs a connecting function to the network to enable each peripheral unit to transmit the property information and the address information over the network, and when the board is replaced, the management system reads the property information and the address information and determines whether or not the main body of the peripheral unit has been replaced.

3. The peripheral unit management system according to claim 1, wherein each peripheral unit comprises:
   a main body, and
   a board having a first recording medium to record the property information and a second recording medium to record the address information, wherein the board is inserted to and removed from the main body and performs a connecting function to the network to enable each peripheral unit to transmit the property information and the address information over the network, and when the board is replaced, the management system reads new property information set by an operational panel or the peripheral unit and reads new address information recorded in the second recording medium, and determines whether or not the main body of the peripheral unit has been replaced.

4. The peripheral unit management system according to claim 1, wherein the property information comprises a serial number of the corresponding peripheral unit.

5. A peripheral unit management method to manage a plurality of peripheral units using a peripheral unit manager via a network, wherein the peripheral unit manager stores property information and address information corresponding to each peripheral unit, comprising:
   communicating with each of the peripheral units;
   reading the property information and the address information from each of the peripheral units;
   determining that one of the peripheral units has been replaced when the property information read does not coincide with the property information stored in the peripheral unit manager, and when detecting that the address information of one of the peripheral units is new;
   obtaining the new address information of the one of the peripheral units when determining that the one of the peripheral units has been replaced; and
   when the property information read does not coincide with the property information stored in the peripheral unit manager, storing the property information read and the new address information of the one of the peripheral units, and, when the property information read does coincide with the property information stored in the peripheral unit manager, storing data accumulated in the peripheral unit with the new address information of the one of the peripheral units after setting the property information to correspond to the new address information.

6. The peripheral unit management method according to claim 5, wherein each peripheral unit comprises a main body having a first recording medium to record the property information and a board having a second recording medium to record the address information, wherein the board is inserted to and removed from the main body, the method further comprising:
   performing a connecting function to the network to enable each peripheral unit to transmit the property information and the address information over the network;
   reading the property information and the address information when the board is replaced; and
   determining whether or not the main body of the peripheral unit has been replaced.

7. The peripheral unit management method according to claim 5, wherein each peripheral unit comprises a main body, and a board having a first recording medium to record the property information and a second recording medium to record the address information, wherein the board is inserted to and removed from the main body and performs a connecting function to the network to enable each peripheral unit to transmit the property information and the address information over the network, and the method further comprising:
   reading new property information and new address information of the new peripheral unit after the new property information has been set by an operational panel or the peripheral unit when the board is replaced; and
   determining whether or not the main body of the peripheral unit has been replaced.

8. A recording medium readable by a computer and used for a peripheral unit management method to manage a plurality of peripheral units by a peripheral unit manager via a network, wherein the peripheral unit manager stores property information and address information corresponding to each peripheral unit and each of the peripheral units is connected to the network to communicate with the peripheral unit manager and other peripheral units, said medium having a program recorded thereon to make the computer execute:

communicating with each of the peripheral units;

reading the property information and the address information from each of the peripheral units;

determining that one of the peripheral units has been replaced when the property information read does not coincide with the property information stored in the peripheral unit manager, and when detecting that the address information of one of the peripheral units is new;

obtaining the new address information of the one of the peripheral units when determining that the one of the peripheral units has been replaced; and when the property information read does not coincide with the property information stored in the peripheral unit manager, storing the property information read and the new address information of the one of the peripheral units, and, when the property information read does coincide with the property information stored in the peripheral unit manager, storing data accumulated in the peripheral unit with the new address information of the one of the peripheral units after setting the property information to correspond to the new address information.

* * * * *